(12) United States Patent
Shetterly et al.

(10) Patent No.: US 9,251,763 B2
(45) Date of Patent: Feb. 2, 2016

(54) SYSTEM AND METHOD FOR IMAGE COLLAGE EDITING

(71) Applicant: PicMonkey Inc., Seattle, WA (US)

(72) Inventors: Jennifer Laurie Shetterly, Sammamish, WA (US); Brian Scott Terry, Seattle, WA (US); Justin James Huff, Seattle, WA (US)

(73) Assignee: PicMonkey, LLC, Seattle, WA (US)

( * ) Notice: Subject to any disclaimer, the term of this patent is extended or adjusted under 35 U.S.C. 154(b) by 58 days.

(21) Appl. No.: 13/902,473

(22) Filed: May 24, 2013

(65) Prior Publication Data

US 2013/0314434 A1    Nov. 28, 2013

Related U.S. Application Data

(60) Provisional application No. 61/652,026, filed on May 25, 2012.

(51) Int. Cl.
*G09G 5/14* (2006.01)
*H04N 1/38* (2006.01)
*G06T 11/60* (2006.01)
*H04N 1/387* (2006.01)

(52) U.S. Cl.
CPC *G09G 5/14* (2013.01); *G06T 11/60* (2013.01); *H04N 1/38* (2013.01); *H04N 1/387* (2013.01)

(58) Field of Classification Search
CPC . G09G 2354/00; G06F 3/0484; G06F 17/248; G06T 19/00; G06T 3/4038; G06T 2207/20212; G06T 2207/20221
See application file for complete search history.

(56) References Cited

U.S. PATENT DOCUMENTS

| 2005/0044485 | A1* | 2/2005 | Mondry et al. ............... 715/502 |
| 2011/0016406 | A1* | 1/2011 | Grosz ................ G06F 17/3028 715/741 |
| 2013/0076773 | A1* | 3/2013 | Chen et al. .................... 345/589 |

* cited by examiner

*Primary Examiner* — Antonio A Caschera
(74) *Attorney, Agent, or Firm* — K&L Gates LLP (57) ABSTRACT

A system and method for a system and method for implementing an image collage editing software tool implemented in a networked computing environment. Collage is a feature area within an online image editing service that allows users to create a composite image from multiple images. This composite image, generally known as a 'collage', can be created with a variety of predefined designs/patterns, as well as user specified number of columns and/or user specified number of rows. Users are allowed a wide array of flexibility on the design of their collage, as a result of the unique user-interface design of the collage feature. The collage area is an in-browser, web-based solution for creating any composite image from multiple images.

8 Claims, 4 Drawing Sheets

SYSTEM AND METHOD FOR IMAGE COLLAGE EDITING

PRIORITY CLAIM

The present application claims the benefit of U.S. Provisional Patent Application Ser. No. 61/652,026, filed May 25, 2012, which application is incorporated herein by reference in its entirety.

BACKGROUND

Digital image editing and digital image editors are common in today's digital photography technology. In digital editing, photographs are typically taken with a digital camera and input directly into a computer for storage and manipulation. Additionally, traditional printed photograph may be digitized using a scanner and also stored and manipulated on a computer. Images can also be stored and obtained from stock photography databases. With the advent of computers, graphics tablets, and digital cameras, the term image editing encompasses everything that can be done to an image in a darkroom or on a computer. Image editing is most commonly subtle (e.g., alterations to coloring, contrast, so forth), but may be explicit also (e.g., overlaying a head onto a different body, changing a sign's text). Image editing software can be used to apply effects and warp an image in whatever way possible until the desired result is achieved. Image editing software can also be used to create images from scratch for example with tools for drawing or adding text. Sometimes, after image editing, the resulting image has little or no resemblance to the image from which it started.

Digital image editing computer programs are prevalent and easily accessible and provide a means that allows any computer to be used for digital image editing. Often times, a standalone software package may be purchased and installed on a personal computer or in a computer networking environment. These conventional software programs allow for digital images to be manipulated and saved at the local machine in which the image editing software is running. Thus, a user of personal computer with such image editing software may easily manipulate any number of digital images that are also stored at that computer. In this scenario, the task-intensive steps of actual image manipulation are accomplished by the personal computer.

Further, various networking environments may allow image editing software to be run at some accessible server computer such that images are manipulated at the server computer at the behest of the connected client computer. In this scenario, the task intensive steps of actual image manipulation are accomplished by the server computer that hosts the image editing software and the client computer merely acts as a controller.

With the advent of web sites and server farms capable of storing a tremendous amount of data, various computer users have begun storing digital images in online storage services. In this manner, a person may access stored digital images from any computer that the person may be using. With universal access to stored digital images, one may upload images from virtually anywhere and store the digital images in an online manner. However, well-known and comprehensive image editing software may only be resident on one personal computer or within a specific network of computers. Thus, even if a person is able to upload and store their newly created digital images from any computer connected to the internet, the person cannot access their image editing software to manipulate the newly created and stored digital images.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be a system and method for a system and method for implementing an image collage editing software tool implemented in a networked computing environment. Collage is a feature area within an online image editing service that allows users to create a composite image from multiple images. This composite image, generally known as a 'collage', can be created with a variety of predefined designs/patterns, as well as user specified number of columns and/or user specified number of rows. Users are allowed a wide array of flexibility on the design of their collage, as a result of the unique user interface (UI) design of the collage feature. The collage area is an in-browser, web-based solution for creating any composite image from multiple images. The 'collage' area is a solution for creating composite images by allowing full drag-n-drop functionality to a user. The 'collage' area is a solution for creating composite image images that is uniquely integrated within a full featured image editing application. The 'collage' area is a solution for creating composite images without the use of a downloaded, installed, 'client' executable software program.

Additional features include a uniquely wide array of flexibility in the design of image collages. For example, the collage UI is unique in allowing users to be able to drag-and-drop an image into the collage area to create a new placement for the image. Further, a user may manipulate free movement of the placed image within the image window, after the image has been placed and create a new column or new row of images simply by adding new images to the edges of the collage area. Further yet, a user may select and move any frame edge to affect size of adjacent images, select any color for the 'frame' of the collage, and select the style of the images' frames; perpendicular corners vs. rounded corners.

Figure 1:
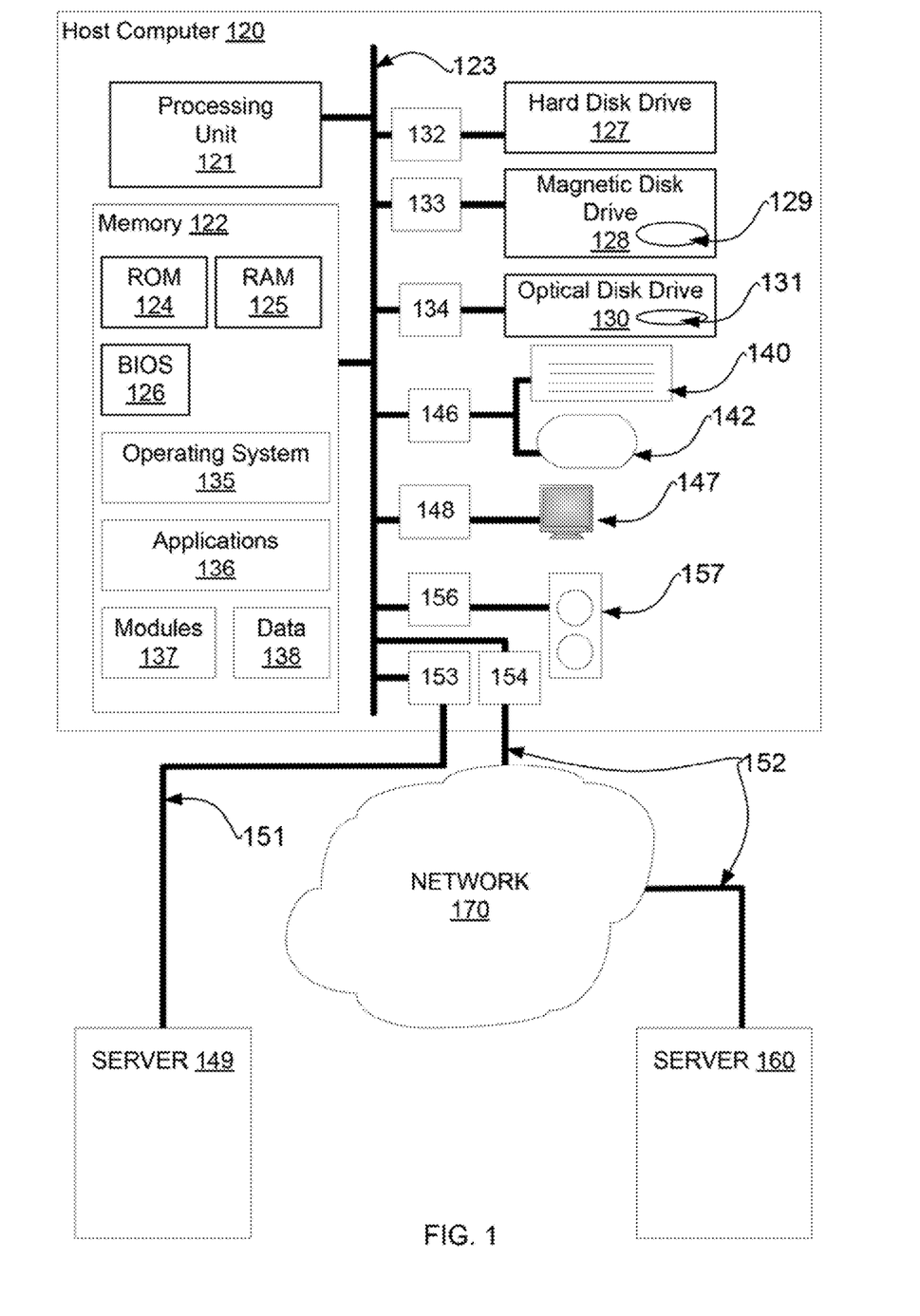
FIG. 1 is a diagram of a suitable computing environment for practicing various aspects of the disclosed subject matter according to an embodiment of the subject matter disclosed herein.

FIG. 1 and the following discussion are intended to provide a brief, general description of a suitable computing environment in which the subject matter disclosed herein may be implemented. Although not required, aspects of a system and method will be described in the general context of computer-executable instructions, such as program modules, being executed by a personal computer. Generally, program modules include routines, programs, objects, components, data structures, etc., that perform particular tasks or implement particular abstract data types. Such program module may be embodied in both a transitory and/or a non-transitory computer readable medium having computer-executable instructions. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the systems and methods disclosed herein includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory includes read only memory (ROM) 124 and random access memory (RAM) 125. A basic input/output system (BIOS) 126, containing the basic routines that help to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. One or more speakers 157 are also connected to the system bus 123 via an interface, such as an audio adapter 156. In addition to the monitor and speakers, personal computers typically include other peripheral output devices (not shown), such as printers.

The personal computer 120 may also operate in a networked environment using logical connections to one or more remote computers, such as remote computers 149 and 160. Each remote computer 149 or 160 may be another personal computer, a server, a router, a network PC, a peer device or other common network node, and typically includes many or all of the elements described above relative to the personal computer 120, although only a memory storage device 150 or 161 has been illustrated in FIG. 1. The logical connections depicted in FIG. 1 include a local area network (LAN) 151 and a wide area network (WAN) 152, which includes network 170. Such networking environments are commonplace in offices, enterprise-wide computer networks, intra nets and the Internet. As depicted in FIG. 1, the remote computer 149 communicates with the personal computer 120 via the local area network 151. The remote computer 160 communicates with the personal computer 120 via the wide area network 152.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123. In a networked environment, program modules depicted relative to the personal computer 120, or portions thereof, may be stored in the remote memory storage device. It will be appreciated that the network connections shown are exemplary and other means of establishing a communications link between the computers may be used.

Figure 2:
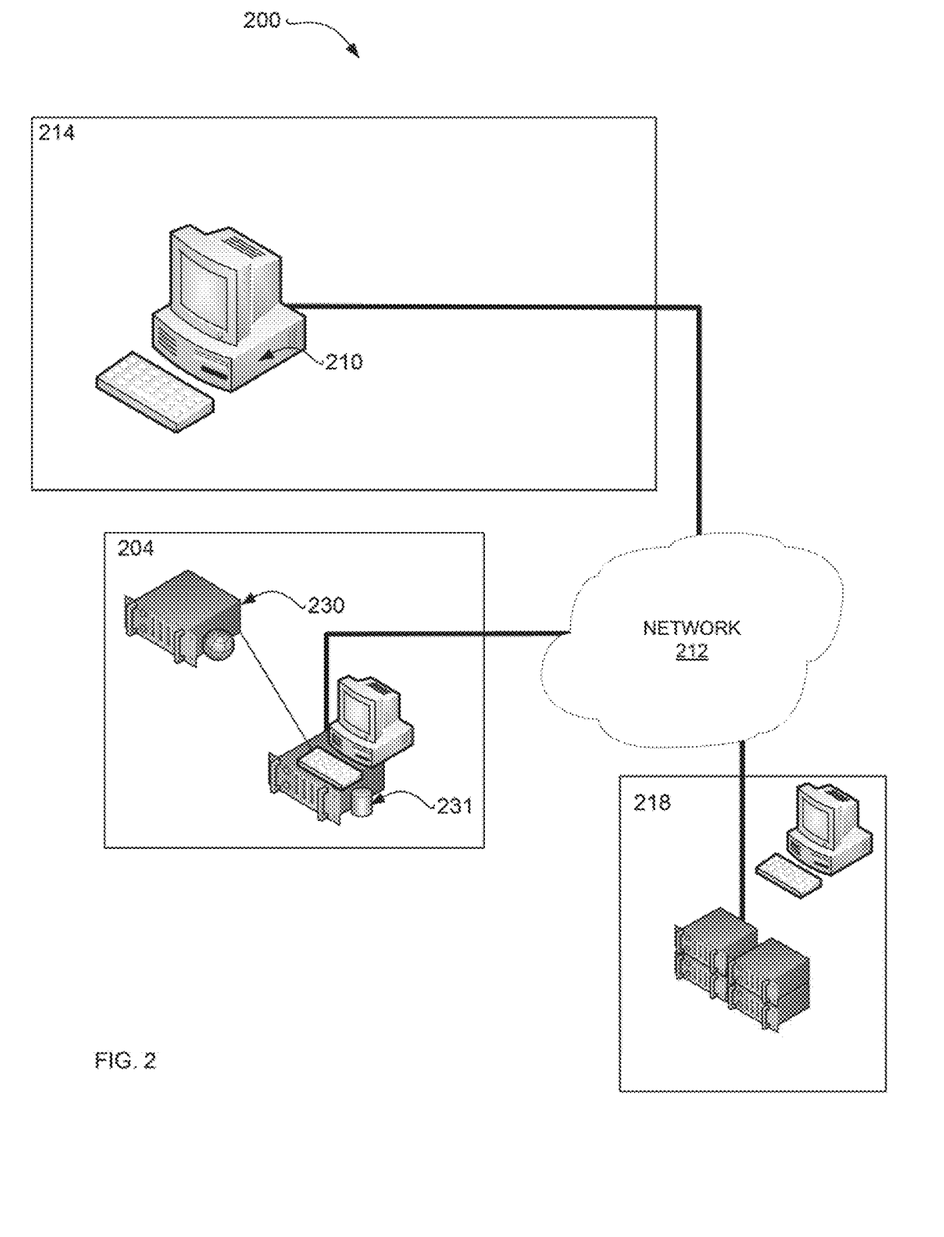
FIG. 2 is a diagram of a suitable computing network for practicing various aspects of an in-browser image editing system and method according to an embodiment of the subject matter disclosed herein.

FIG. 2 illustrates an exemplary architecture of a networked computer system 200 in which aspects of the system and applications described herein as may be practiced. The computer network 212 may be a local area network 151 (FIG. 1), a wide area network 152 (FIG. 1), or a combination of networks that allow the server computer 204 to communicate with remote computers, such as the remote server computer 218, either directly or indirectly. The server computer 204 and the remote server computer 218 are typically similar to the personal computer 120 depicted in FIG. 1 and discussed above.

Such a computer network 212 allows for the sending and receiving of data associated with digital images. Such data may be stored in a database 231 on a server computer 204. This data may be updated, assimilated and/or altered according to additional data sent and received to and from various other computers in the computer network such as remote server computer 218.

With such a computer network, a system for manipulating digital images in a computer-network environment may be realized. A typical system includes a client computer 214 having a web browser application 210 executing thereon and having an in-browser image manipulation application executing within the context of the web browser application. Typically, a client computer 120 will have a dedicated web browsing application, such as Internet Explorer™ from the Microsoft™ Corporation such that when browsing web pages over the Internet, a set of default rules and applications are implemented to accomplish all web-browser related activities. The web browser application may also be any other common web browser such as Mozilla Firefox™, Netscape Navigator™, and Safari™. The web browser may be used to navigate and utilize web sites and web applications.

The system may further include a server computer 204 communicatively coupled to the client computer 214 over the computer network 212. In one embodiment, the server computer 204 includes an image manipulation service 230 executing thereon, such that a client computer 120 may invoke the service via the Internet connection. With that, the in-browser image editor includes an image manipulation application that is operable to handle a number of image manipulation tasks.

The system may further include a remote client computer 218 communicatively coupled to the client computer 214 and the server computer 204. The remote client computer 218 may be used for additional storage and manipulation of images such that it is operable to store digital images for the client computer 214 to retrieve for manipulation.

Figure 3:
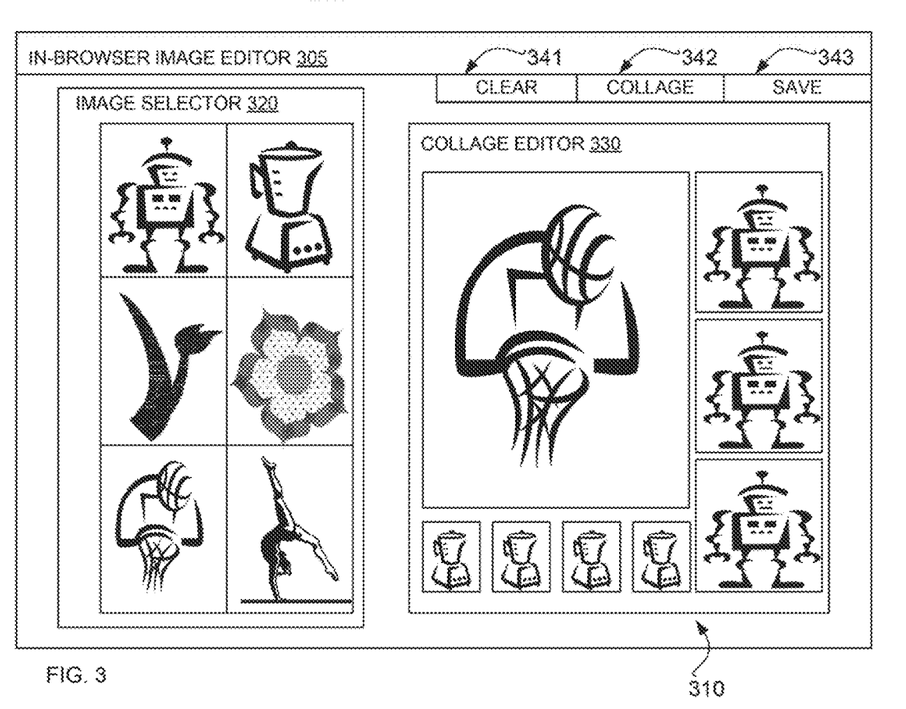
FIGS. 3 and 4 shows screen shots of an in-browser image editing application suited to use collage editing features according to an embodiment of the subject matter disclosed herein.
Figure 4:
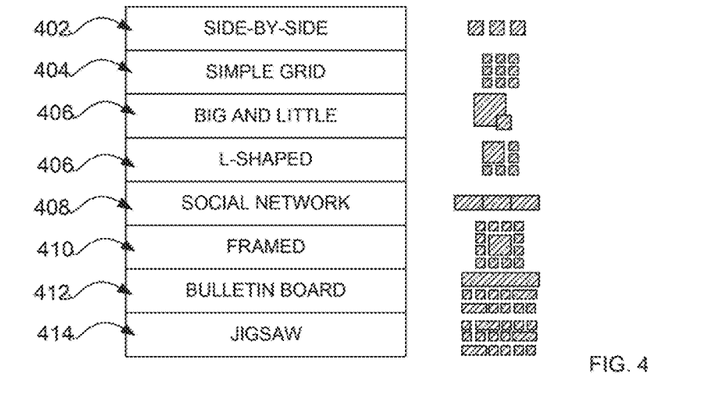
Figure 5:
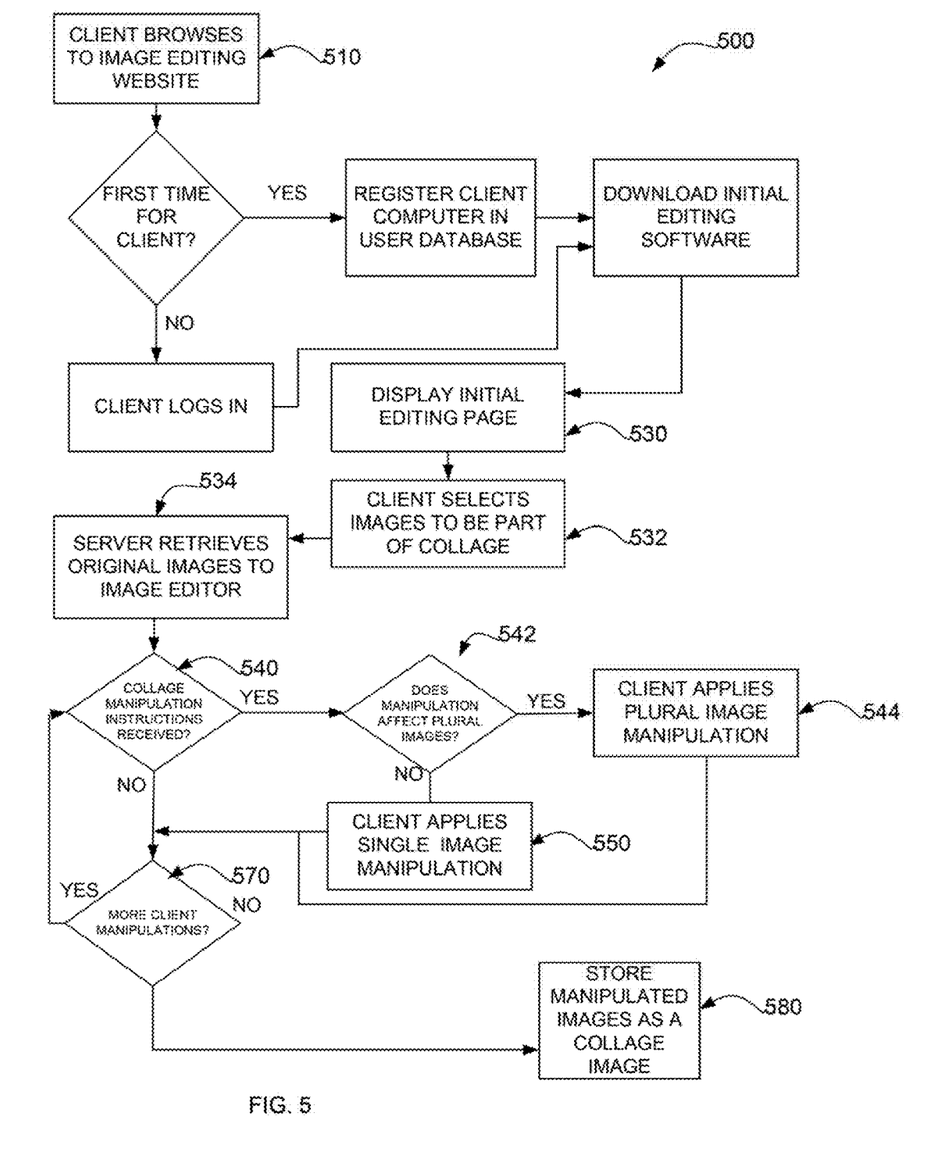
FIG. 5 shows a flow chart of a method for using collage editing features in the context of an in-browser image editor according to an embodiment of the subject matter disclosed herein.

The remaining detailed description discusses aspects of the subject matter with respect to FIGS. 3-5. Turning attention to FIG. 3, a basic screen shot of an in-browser image editing application 305 is shown. Within the context of the in-browser image editing application 305 that may be executing on a client computer, a plural image editing feature may be one of the features a user may invoke. Plural image editing is a feature area that allows a user to create a composite image from multiple images. This composite image 310, generally known as a 'collage', can be created with a variety of pre-defined designs/patterns, as well as user specified number of columns and/or user specified number of rows. In the remainder of this detailed description, plural image editing may be referred to as collage editing.

Users are allowed a wide array of flexibility in the design of a collage 310. For example, a user may drag-and-drop an image from an image selector area 320 into a collage editor 330 to create a new placement for the specific image or images. Further, free movement of the selected image within an image window, once the image has been placed is also allowable. Additional features may be invoked as will be described in greater detail below including creation of a new column or new row of images by adding a new image to the edge of the image area, selection and movement of any frame edge to affect size of adjacent images, selection of any color for the frame of the collage, and the style of the images' frames; perpendicular corners vs. rounded corners, etc.

Users may implement various aspects of image editing using an Image Selector panel 320 displayed on a web page when a user browses to a specific website. A dropdown menu (not shown) allows a user to switch between sample images and images from the client computer. The sample images may be shown by default so a user can easily use a collage editing technique without having to upload various images. In other embodiments, this drop-down menu allows a user to view images from other sources, such as remote client computers or remote server computers.

When images are uploaded from the client computer, they may appear in a "From my computer" basket list. In an embodiment, there may be a limit of 40 images that a user may add. If a user has no images in the basket, only the Upload button may be shown. Further, a "clear unused" button 341 may be visible (it does not scroll off the screen). If the basket is empty the button may be disabled.

Once images are uploaded and able to be used in collages, a user may place and manipulate images according to several different actions that include up state, over state, down state and drag image. Once a user moves the image out of the image selector 320, the image in the image selector 320 may go back to its up state and a copy of the image may appear above the cursor as a user moves it. The image copy may be shown at its actual aspect ratio and be ghosted at N % opacity. The image may be positioned above the cursor, centered.

In one embodiment, images in the collage editor 330 may be placed into an image cell. Generally, an image cell may be a location for image to be placed within a collage 310. The image cell may have relationships with other image cells in the collage editor 330 such that manipulating one image (image cell) may affect another image (second image cell). To create a new image cell, a user may drag an image to the edge of any cell and drop it in when a user sees the insert line appear. Once an image has been added to the collage 310, the image in the image selector 320 may show a checkmark. One may add an image to the collage 310 more than once.

In an embodiment, a user may add new cells, columns, and rows when dragging an image to the collage editor 330. Generally, a user may establish an initial set of image cells by selecting an initial layout template. Such layout templates may be selected from a layout template drop-down menu as described below with respect to FIG. 4.

FIG. 4 shows a drop-down menu 342 with a number of template title as well as an example image to the right representing the template. Such a drop-down menu may be available as a feature when a user is using the web-browser based image editor as shown in FIG. 3. The layout templates available in this example include a side-by-side template 402 wherein images are laid out in a row, a simple grid template 404 wherein the images includes rows and columns. Further, another template is a big and little template 406 having one image large and one image small. Yet another template is an L-shaped template 406 having small images flanking one large image in two directions. Still further, other templates include a social network template 408, a framed template 410, a bulletin board template 412, and a jigsaw template 414, each having layouts as generally shown in FIG. 4.

When a cursor is over any border of a cell in the collage editor 330, a user will see possible drop targets depending on the cursor position. When dragging an image into any layout template, the overall aspect ratio may be fixed. Further, each template may have default dimensions that may be set. A user can override this by changing the actual pixel dimensions. If a user changes the spacing of the borders to zero, the drop target affordances are still visible. The minimum number of cells may be one. In an embodiment, a cell has four possible drop targets. When dragging an image onto a border of a cell, a user may only see the drop targets nearest a user cursor. Drop targets only appear near cells that are occupied. If a user chooses to make a custom collage, a user may see one empty cell on the canvas. A user should first fill the empty cell with the image before adding more cells.

In a layout with one row or one column, a user may see a drop target between images. When an image is added, the cells in the row or column to which the image is added are evenly distributed. Canvas typically never scrolls. When adding to the outside of a layout that has multiple rows or columns, a user may see (a) a drop target to add a column or row for the full length of that side or (b) the drop targets for the rows or columns on that side.

In the context of working with images that are within the collage editor 330 of FIG. 3, a number of manipulations are also available to a user on the individual image basis or as an edit to the collage in general. One feature includes the Remove Image feature. A delete button will appear on mouse over on any image that has not been used in the collage. When one mouses over the delete icon, one will see a button and tooltip. This is the same visual style as the remove cell button. Once a user clicks Remove, the image is removed from the image selector 320.

Another feature includes an upload button 343. No matter what list a user is viewing, the first square may show the action for uploading images into the basket. When a user clicks this button, the system File Open dialog will open where a user may save an image or collage to a specific location.

Another aspect includes an image selector full dialog. If the image selector 330 has reached the maximum number of images allowed, when a user clicks Upload, the user sees a dialog that the basket is full. One such message may read "Collage can handle up to 40 images, and you're maxed out, heavy hitter! If you want to add more, remove some first to make room."

Turning attention back to FIG. 4, there are a set of categories with each having a set of templates based on a scaling number of images or layout variations. For each template one defines the aspect ratio and dimensions of the image cells in the template. In addition to the templates, a user may have the option to create one from scratch. When a user choose this option, the layout will show a drop target for a single cell (if a user have not added any images yet to the canvas) and a user can add another image to start creating a user's own custom layout. The template will not be prepopulated so a user can make the collage from scratch.

Generally, when creating a template from scratch, a user may control spacing. This is a global setting that applies to any layout a user chooses. It may comprise a slider with an edit field to quickly enter a specific number. Further, the user may apply a method of hovering over a number which displays the edit field so that the user can type directly into the field instead of using the slider.

Additionally, a user may change the radius of the corners of a user cells. A slider and edit field behaves the same as the spacing control. Further, the user may control background transparency. By default the feature is unchecked (e.g., no transparency). When the box is checked the background becomes transparent. If the user clicks on a color to use for the background, the checkbox for transparency becomes unchecked.

The user may control color. This is a global setting that applies to any layout a user chooses. The color picker for changing the background color should allow a user to: view the full color spectrum palette, type in a RGB value for a custom color, choose a color from a user's image using an eyedropper, slide a slider similar to a highlights panel where the user can adjust saturation, and display recent colors.

Auto-fill is a quick way to add images to a user collage is with Auto-fill. •This button is disabled if no images are in an image selector list. Once a user is done with creating a collage and wants to start over with a new one in the same session a simple way to clear a user collage of images is "Clear All". This button is disabled if no images are in a user collage.

A user can take any layout and rotate it. When rotating, the images stay upright but their position moves as their cell moves. A user can save directly from the Collage without going to the Editor so a user need to be able to view and set dimensions of a user image for different uses. A user can view and change the dimensions of any layout. Each template will have unique default dimensions. There may be a minimum and maximum size overall. A user can lock and unlock the dimensions of a template to change the aspect ratio.

When hovering a cursor over the borders of a collage, the cursor will change to indicate that a user may click and drag to resize the columns and rows of a collage. On click, a user may see a visual affordance appear in the border that a user is moving. When resizing a column or row, it may only affect the columns or rows on either side of the border. No other columns or rows change. In addition, when resizing inner borders, the outer dimensions of the collage do not move. As a user moves columns or rows, especially with some templates that have lots of small images, a user may hit a minimum or maximum size limit—a user cannot make the row or column any smaller or larger. A user cannot resize the outer borders. If a user wants to change the overall aspect ratio or actual pixel dimensions, a user can change this in the layout panel.

As a user moves a row or column, the display may show some visual guides to suggest possible points to drag to. As a user hits a guide, the guide may light up to show a user when a user hits it and can stop moving. Possible uses include showing where to drag to in order to make a column or row square. Showing where the half point is between two columns or rows (so they're even). Showing where the null point (or another major increment) is between two columns or rows.

A user can choose from the texture images from the collage editor 330 as backgrounds. Each image may be at 100% opacity. The user can still rotate the image. If a user choose a background image and spacing is set to zero, the border will be reset to its default width and the background applied. A user can also view a dropdown list of sizes as a quick way to change the dimensions. The list will show some common aspect ratios and online screen sizes.

FIG. 5 shows a flow chart of a method 500 for using collage editing features in the context of an in-browser image editor according to an embodiment of the subject matter disclosed herein. Within the context of FIG. 5, the method 500 may begin at a client computer when an image is desired to be retrieved for manipulation. As a first step 510, a user may browse to an image-editing website (i.e., a specific URL) as a basis for beginning an image-editing method.

When accessed, a server computer that hosts the URL and related services may initiate a transparent download of the image editing application to the local client computer such that when the client computer accesses the URL again, the process is streamlined due to pre-loaded functionality. The application operates in real time and is developed on top of a secure runtime with high performance graphics capability such as Flash™ from Adobe™ or Silverlight™ from Microsoft™. Flash™ is a popular method for adding animation and interactivity to web pages and several software products, systems, and devices are able to create or display Flash™. Flash™ is commonly used to create animation, advertisements, various web-page components, to integrate video into web pages, and more recently, to develop rich Internet applications.

As a result, the user may experience a more user-friendly desktop feel to an in-browser image-editing system and method. Further, additional aspects of the system and method disclosed herein may be implemented of claim outside of browser realm, i.e. a desktop application that may operate in its own windowed environment. Further, the method and system may be extended by hybrid cooperation of the in-browser image editor with a desktop application to increase the overall capability of the system. Further yet, the method and system may be further extended to allow a desktop application to be remotely accessed from a remote location using a web browser on a wholly separate client machine that is accessible via a network (e.g., the internet, a company intranet, etc.). Still further, the method and system disclosed herein allows for third party software to securely extend a web application to take advantage of the locally available functionality of the in-browser image-editing software as well as the server-side capabilities allowed through the in-browser image-editing software. This may typically be accomplished through third party software programmers building modules/bridges to the in-browser image-editing software in order to transfer data and/or files, or to provide additional editing functionality, or general application features.

Once the client computer is ready to use an in-browser image editing system, an initial editing page may be displayed in the browser at step 530. Specific aspects of the initial editing page and other subsequent pages were discussed above with respect to FIGS. 3-4.

At step 532, a user of the client computer may then locate and retrieve an image for collage manipulation. In a first method, a user may retrieve an image stored at a local data store (e.g., a local hard drive, DVD-ROM, etc.) for image manipulation. Alternatively, specific relationships and links with other websites and server computers may be established such that the user may log in to the local website and immediately be able to access digital photos stored on other linked websites. A list of accessible locations may be displayed in the browser and may include a local drive, a network drive, or any number of linked storage services such as Yahoo.com™ or Flickr™. Further, a user may even enter a URL to search for photos that may be resident at the URL location.

As an image is selected by the user, two copies are typically realized. A copy remains at the server computer that retrieved the image and the server also transmits a copy of the image to the client computer at step 534. If this particular image has been previously manipulated within the context of this system and method, then manipulation instructions will also typically be stored with the image. The above image retrieval process may repeat at any time to populate the image selector panel 320 with a number of images. As images are ready to be used in a collage and then imported into the collage editor 330, the user may initiate collage editing instructions.

At step 540, the method determines whether or not manipulation instructions are related to an individual image without regard to a collage or related to image in the context of the collage. If not, then the image may be manipulated independent of its collage and the method then loops to a decision at step 570 for more instructions or not. If the image manipulation is a collage manipulation, the method moves to step 542 wherein a determination is made as to whether the image manipulation affects plural images. If the instruction received does not affect plural images (e.g., more than one), the method proceeds to step 550 where the single image is manipulated. If the instruction received does affect plural images (e.g., more than one), the method proceeds to step 544 where the collage is manipulated according to a set of collage editing rules as discussed above. Such manipulations may be setting an initial template, rotating the template, changing borders and sizes, adding background imagery and transparency, etc. Once this iteration of an instruction is completed the loop turns back to decision step 570 as discussed above. If there are no further instructions to process, the method moves to step 580.

At step 580, which may also correspond with a save image at the local computer, the client computer sends all manipulation instruction information to the server computer. The server computer may then implement all uploaded instructions to its copy of the image. The server computer may also then store the manipulated image as well as the uploaded set of manipulation instructions at its own data store or some remote data store in which the image was first retrieved.

In another embodiment, the manipulation instructions may be transmitted individually to the server computer as the user invokes them in real time. That is, instead of waiting until the user saves the image after numerous manipulation instructions, the individual manipulation instructions may be transmitted to the server after each manipulation is invoked. In this manner, the copy of the image on the server may also undergo the manipulation in actual real time as a mirrored copy of the image at the client computer.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A computing system, comprising:
a client computer having a display that displays an image collage in an image window, wherein the image collage comprises a plurality of images, wherein the plurality of images comprises at least a first image and a second image; and
a server computer having an image editing application for executing thereon, wherein the server is in communication with the client computer via a network, and wherein the server computer receives a user-specified manipulation instruction from the client computer; and
wherein upon receiving the user-specified manipulation instruction from the client computer the server computer invokes an image collage manipulation at the server computer and subsequently alters the image collage displayed in the image window at the client computer based on the manipulation instruction; and
wherein the user-specified manipulation instruction comprises a desired manipulation of the image collage displayed in the image window at the client computer; and
wherein the server is configured to determine whether the user-specified manipulation instruction is related to manipulating a single image in context of the image collage, or whether the manipulation instruction is related to manipulating a plurality of images in the context of the image collage; and
upon determining that the user-specified manipulation instruction is related to manipulating a single image in the context of the image collage, the server performs the desired manipulation from the user-specified manipulation instruction with regard to the single image; and upon determining that the user-specified manipulation instruction is related to manipulating a plurality of images in the context of the image collage, the server performs the desired manipulation on the plurality of images from the user-specified manipulation instruction according to a predetermined set of collage editing rules; and wherein the user-specified manipulation instruction comprises a manipulation instruction selected from the group consisting of a free movement of a selected image within the image window once the selected image has been placed in the image collage, a creation of a new column or a new row within the image collage, an adjustment of a size of adjacent images in the image collage, a selection of a color of a frame of the image collage, and a selection of a style of a frame the image collage.

2. The computing system of claim 1, wherein the server computer or the client computer stores a previous user-specified manipulation instruction associated with at least one image of the image collage.

3. The computing system of claim 2, wherein the first image is stored at the client computer and the second image is stored at the server computer.

4. The computing system of claim 1, wherein the user-specified manipulation instruction comprises a manipulation of the first image that affects a parameter of the second image in the collage or a manipulation of the first image that is independent of the second image.

5. The computing system of claim 1, wherein the user-specified manipulation instruction comprises a layout of a template for an image collage, wherein the layout of the template is not predefined and is provided based on a selection of attributes of the layout made by a user.

6. The computing system of claim 1, wherein the user-specified manipulation instruction comprises a layout of a template for the image collage, and wherein the template comprises a template selected from the group including: a grid, a side-by-side, a big and little, a jigsaw, a bulletin board, a social network, an L-shape, and a frame.

7. The computing system of claim 1, wherein the server receives a user-specified instruction to perform a placement of a single image within the image collage, wherein the placement of the single image is independent of other images of the image collage.

8. The computing system of claim 1, wherein the image collage comprises a user specified number of columns or a user specified number of rows.

* * * * *